United States Patent
Abul

(10) Patent No.: US 9,616,909 B1
(45) Date of Patent: Apr. 11, 2017

(54) MULTI-FUNCTIONAL WAGON

(71) Applicant: Ahmad A M A A Abul, Safat (KW)

(72) Inventor: Ahmad A M A A Abul, Safat (KW)

( * ) Notice: Subject to any disclaimer, the term of this patent is extended or adjusted under 35 U.S.C. 154(b) by 0 days.

(21) Appl. No.: 15/234,897

(22) Filed: Aug. 11, 2016

(51) Int. Cl.
*B62B 1/00* (2006.01)
*B62B 3/02* (2006.01)
*B62B 3/00* (2006.01)

(52) U.S. Cl.
CPC ............... *B62B 3/02* (2013.01); *B62B 3/007* (2013.01); *B62B 2206/00* (2013.01)

(58) Field of Classification Search
CPC .. B62B 3/02; B62B 3/007; B62B 3/00; B62B 3/022; B62B 2206/00
See application file for complete search history.

(56) References Cited

U.S. PATENT DOCUMENTS

| | | | |
|---|---|---|---|
| 2,809,755 A | 10/1957 | Martorello | |
| 2,984,514 A * | 5/1961 | Lemley | B62B 3/007 296/14 |
| 4,763,907 A | 8/1988 | Raymond | |
| 4,958,594 A | 9/1990 | Swagerty | |
| 5,165,553 A | 11/1992 | Benson | |
| 5,911,422 A * | 6/1999 | Carpenter | B62B 3/007 280/10 |
| 6,152,461 A | 11/2000 | Dunks | |
| 6,263,893 B1 * | 7/2001 | Spinella | B60J 7/10 135/119 |
| 6,354,611 B1 * | 3/2002 | Mihalic | A45C 11/20 280/30 |
| 6,845,894 B1 | 1/2005 | Vyvoda | |
| 7,963,530 B1 * | 6/2011 | Garcia | B62B 3/02 280/28 |
| 8,544,141 B1 * | 10/2013 | Kyde | A47J 47/18 15/257.7 |
| 8,746,377 B1 * | 6/2014 | Dunbar | B62B 5/0003 180/19.2 |
| 8,966,815 B1 * | 3/2015 | Smiles | A01G 9/022 47/39 |
| 9,145,154 B1 * | 9/2015 | Horowitz | B62B 3/025 |
| 2009/0232633 A1 * | 9/2009 | Stamps | B62B 3/02 414/814 |
| 2010/0090444 A1 * | 4/2010 | Chen | B62B 3/007 280/651 |
| 2010/0156069 A1 * | 6/2010 | Chen | B62B 3/007 280/639 |

(Continued)

FOREIGN PATENT DOCUMENTS

GB  2 295 082 A  5/1996

OTHER PUBLICATIONS

"Wheeled Feeders," Brodhecker Farm Website www.brodheckerfarm.com/Feederswagonstrailers.html.

*Primary Examiner* — Brian Swenson
(74) *Attorney, Agent, or Firm* — Richard C. Litman

(57) ABSTRACT

The multi-functional wagon includes a bin for storing and transporting products such as hay, vegetables, and/or dirt. The bin includes opposing side walls, opposing end walls extending between the opposing sidewalls, and a base, which provides a lower support surface for contents in the bin. The walls are foldable from an upright position to a lowered folded position. One or more containment units and a support assembly are removably connected to support pipes at corners of the bin.

8 Claims, 5 Drawing Sheets

(56) References Cited

U.S. PATENT DOCUMENTS

| | | | |
|---|---|---|---|
| 2011/0000054 A1* | 1/2011 | Trifari, Jr. | B65F 1/1468 24/457 |
| 2011/0079972 A1* | 4/2011 | Watson | B62B 3/007 280/47.4 |
| 2014/0021699 A1* | 1/2014 | Lin | B62B 3/02 280/659 |
| 2014/0083005 A1* | 3/2014 | Collins | A01G 9/02 47/66.6 |
| 2015/0151771 A1* | 6/2015 | Jin | B62B 3/027 280/651 |
| 2016/0052534 A1* | 2/2016 | Henao | B62B 3/02 280/651 |

* cited by examiner

MULTI-FUNCTIONAL WAGON

BACKGROUND OF THE INVENTION

1. Field of the Invention

The present invention relates to a wagon, and more particularly, to a multi-functional wagon for assisting a user in the hauling of various ranch and/or farm related items.

2. Description of the Related Art

Most wagons are not designed to haul a variety of tools and farm products in an efficient and organized manner. For example, while a typical ranch wagon has a bin for storing and transporting hay, it is not equipped to safely carry additional ranch supplies, animal accessories, and/or animals. Attempting to carry such additional items without an organized system can be cumbersome to a rancher when operating the wagon by him/herself.

Because many ranchers operate wagons by themselves, there exists a need for a wagon that provides appropriate storage space for various items. Thus, a multi-functional wagon for carrying a variety of items, solving the aforementioned problems is desired.

SUMMARY OF THE INVENTION

The multi-functional wagon includes a bin for storing and transporting products such as hay, vegetables, and/or dirt. The bin includes opposing side walls, opposing end walls extending between the opposing sidewalls, and a base, which provides a lower support surface for contents in the bin. The walls are foldable from an upright position to a lowered folded position. One or more containment units and a support assembly are removably connected to support pipes at corners of the bin.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
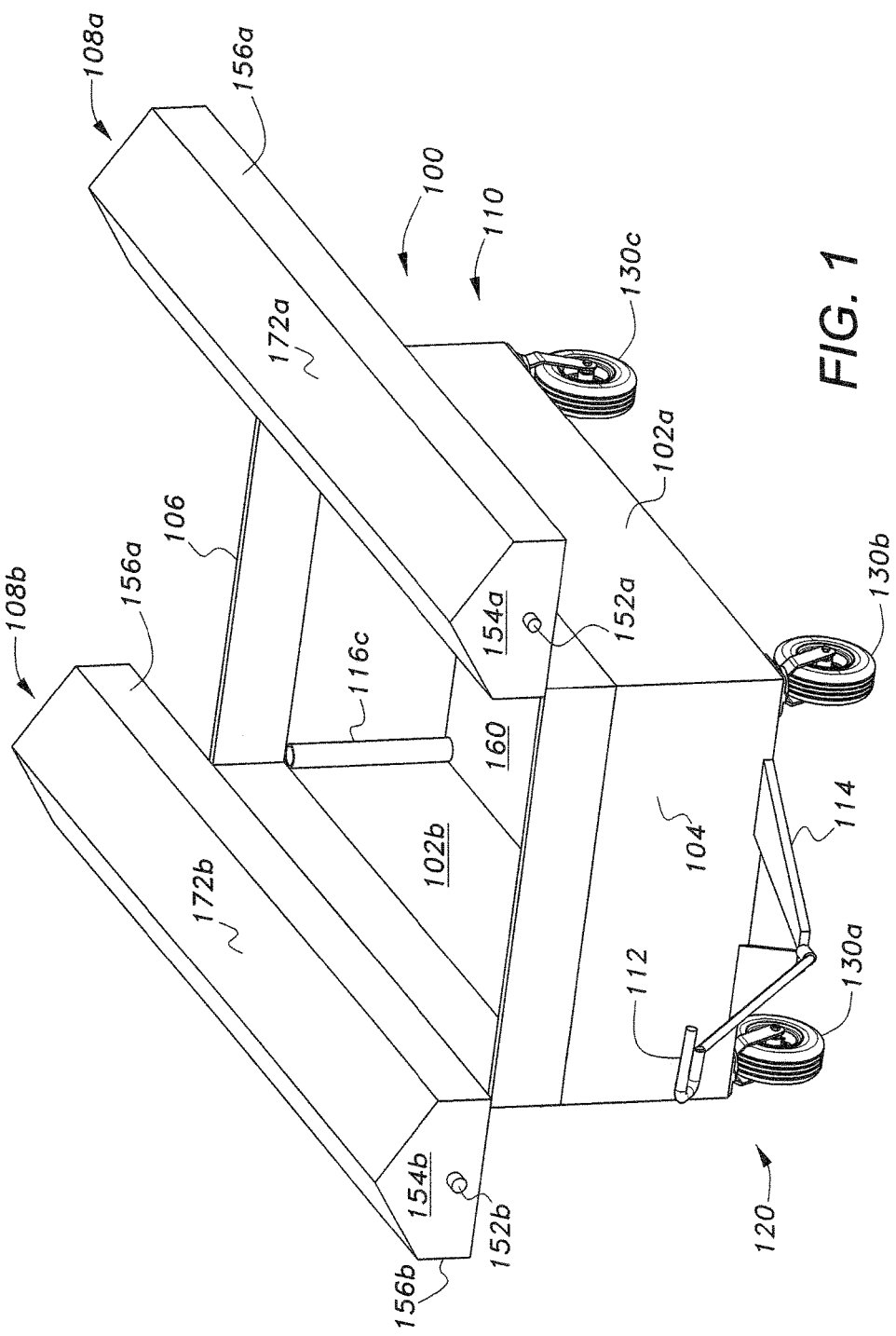
FIG. 1 is an environmental, perspective view of a multi-functional wagon according to the present invention.
Figure 2:
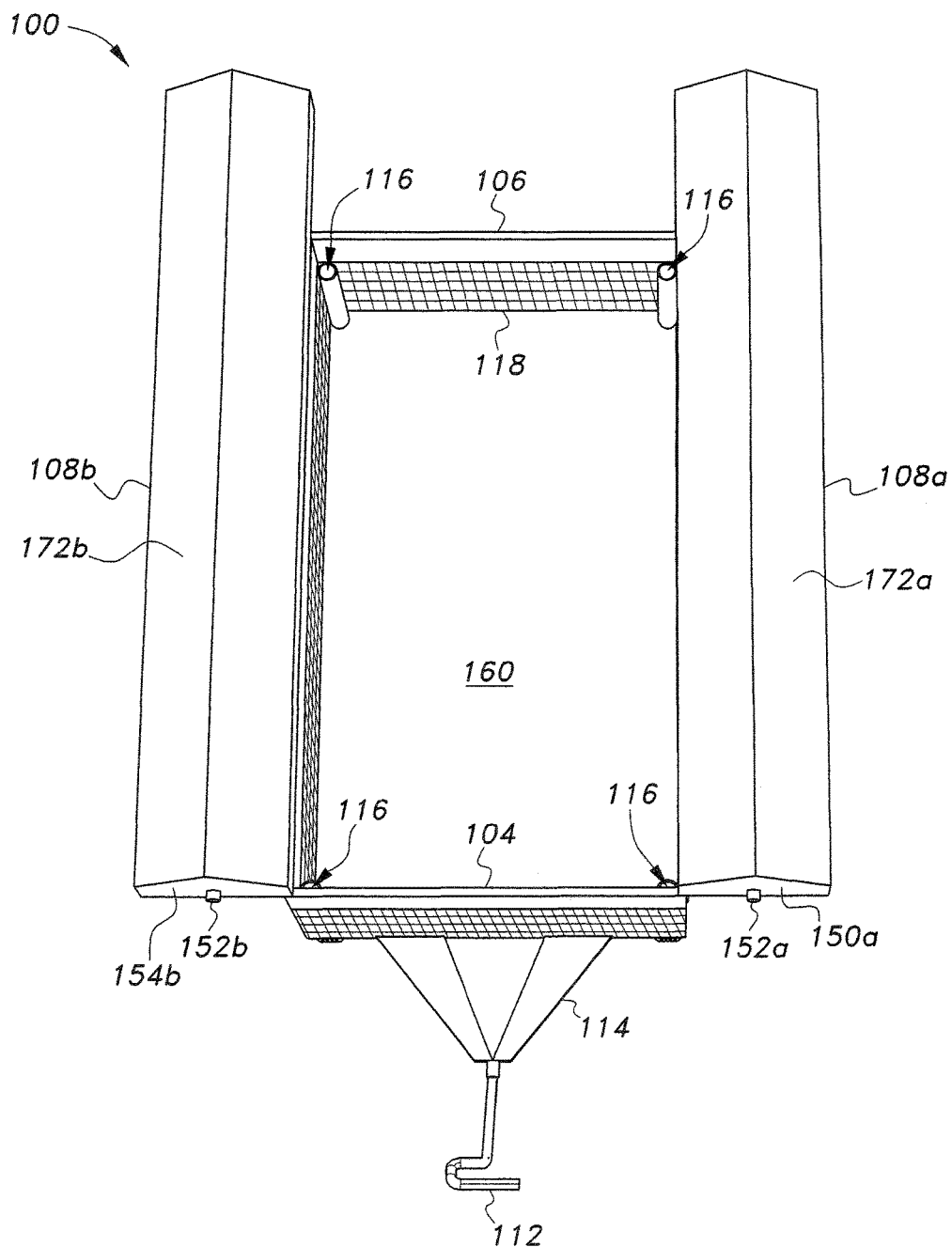
FIG. 2 is a plan view of the multi-functional wagon of FIG. 1.

Referring to FIGS. 1 and 2, there is shown an embodiment of a multi-functional wagon 100, in accordance with the present invention. The multi-functional wagon 100 can be used to haul a variety of work-specific tools, feeding products, and/or devices generally used in a ranch, stable, farm or construction site. The multi-functional wagon 100 includes a bin 120 for storing and transporting products such as hay, vegetables, and dirt, for example. The bin 120 may have a generally rectangular-shaped configuration, including opposing side members 102a, 102b, opposing end members 104, 106 which extend between the side members 102a and 102b, and a base 160, which provides a lower support surface for contents in the bin 120. The side wall members 102a, 102b are foldable from an upright position, as shown in FIGS. 1 and 2, to a lowered folded position (not shown). The front end member 104 and rear end member 106 are also foldable into a lowered position (not shown), providing access into the bin space.

As illustrated, the multi-functional wagon 100 further includes a plurality of wheels 130a-d provided generally at the outer corners of the bin 120, permitting the multi-functional wagon 100 to be moved by the user. The wheels 130a-130d can be capable of swiveling. As shown, a front handle assembly 112 is operatively connected to the front portion of the bin 120, by a bracket member 114 extending therefrom. The front handle assembly 112 may be engaged by the user to control movement of the multi-functional wagon 100.

Figure 3:
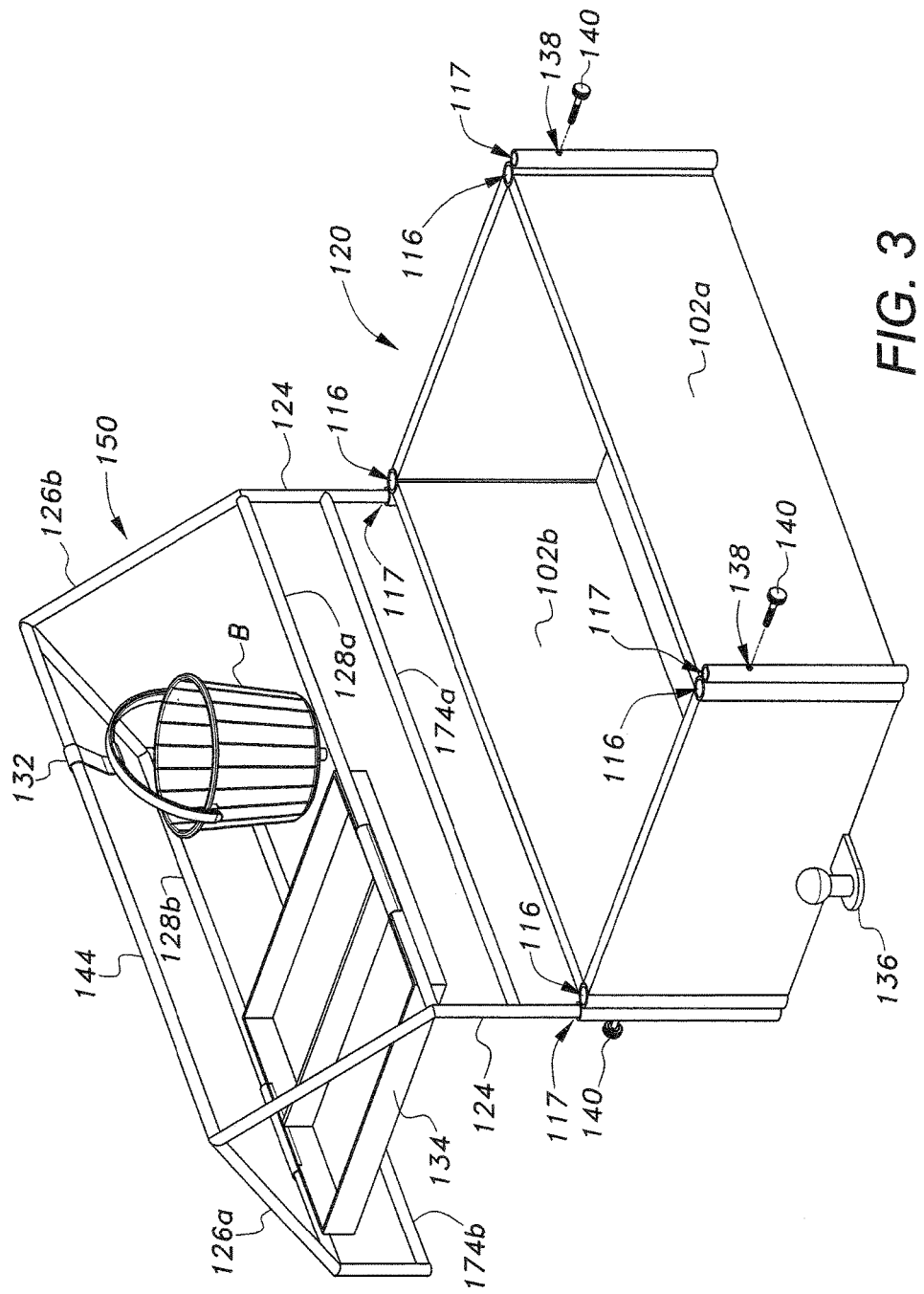
FIG. 3 is a partial perspective view of an embodiment of the multi-functional wagon of FIG. 1, illustrating the support assembly removably connected to the bin.
Figure 4:
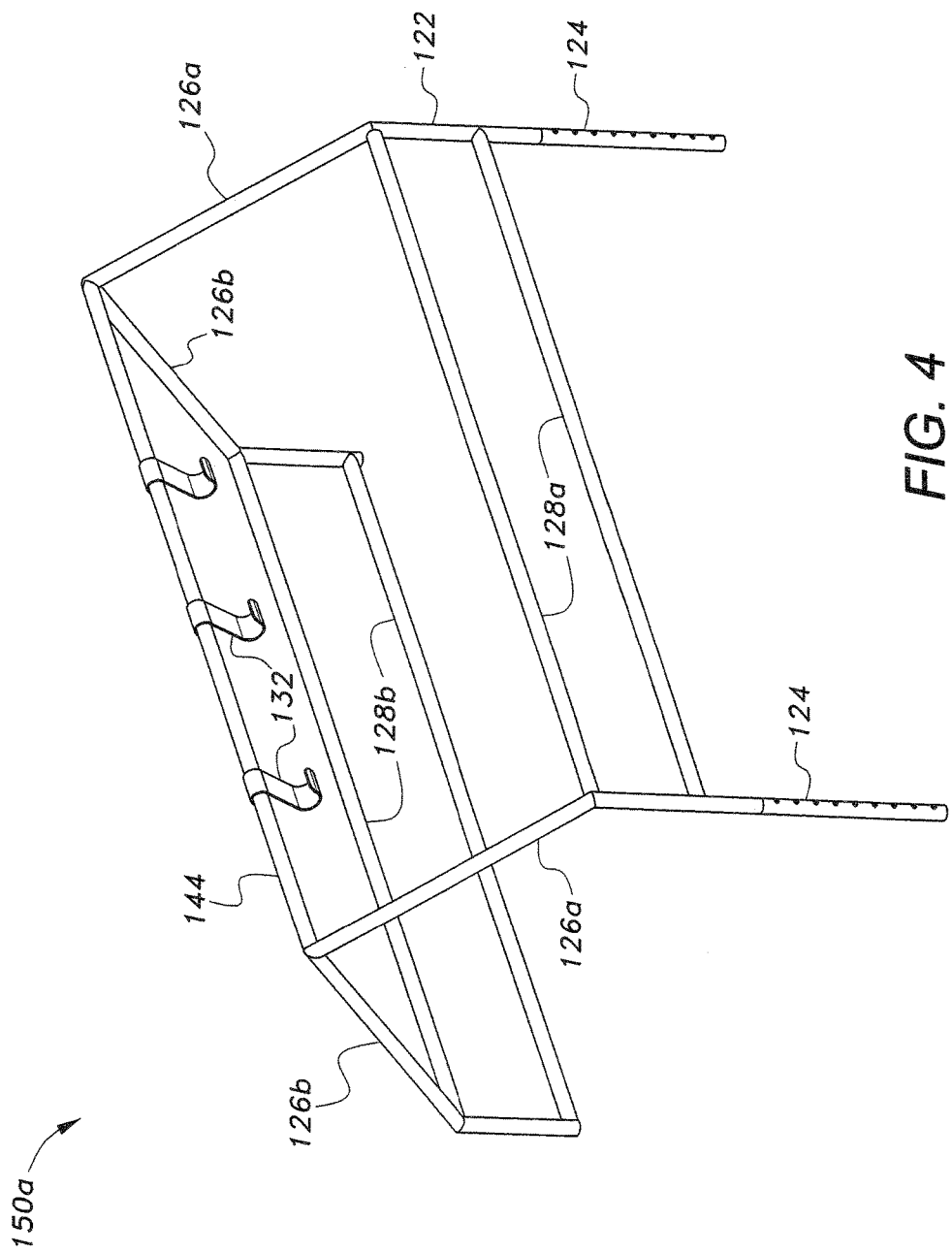
FIG. 4 is a perspective view of the support assembly of FIG. 3, having a triangular-shaped top portion.

The multi-functional wagon 100 may include one or more containment units 108a, 108b, which are removably connected to the bin 120. Connection pipe members 116a-d and 117a-d are positioned at or proximate to the corners of the bin 120. The pipe members 116a-d and 117a-d have a generally cylindrical shape with an aperture extending therethrough to receive connecting extensions (not shown) depending from the containment units 108a, 108b, and one or more support assemblies 150 (each of which will be described later herein). In the embodiment shown in FIGS. 3 and 4, the support assembly 150 is removably attached to the support pipe members 117c-d positioned at the corners of the bin 120.

As illustrated (FIGS. 1 and 2), dual containment units 108a, 108b are positioned on opposing sidewalls 102a, 102b, respectively, of the bin. The containment units 108a and 108b can extend beyond the edge of the side walls 102a, 102b. The multi-functional wagon 100 further includes a rear handle assembly 110 provided at the rear of the containment units 108a, 108b to permit a user to control the multi-functional wagon 100 from the rear.

Each containment unit 108a, 108b has a hollow interior, a triangular shaped top portion 172a, 172b, side panel members 156a, 156b, and door members 154a, 154b with knobs 152a, 152b, provided at the end of the containment units 108a, 108b for controlling access to the interior of units 108a, 108b. The containment units 108a, 108b are configured for holding animals, such as a dog or cat, or tools, such as a shovel, for example.

As illustrated in FIG. 2, the multi-functional wagon 100 may include a retaining net member 118 within the bin 120. When the side walls 102a and 102b are in a lowered, folded position (which will be described further later herein), the net members 118 may be used to retain items such as hay or wood in the bin 120.

The side walls 102a and 102b may be removed and/or lowered, permitting the user to access items contained in the bin 120, such as hay, feed, and/or dirt for example. Openings 138 are formed in the sides of the pipe members 116 for receiving a biased pin member 140 to secure the side walls 102a, 102b to the pipe members 116.

The support assembly 150a includes horizontal, parallel rod members 128a, 128b which extend along the length of the support assembly 150a and provide a mount for supporting a connecting shelf or tray 134. The support assembly 150a further includes vertical support rod members 124 which extend orthogonally from rod members 128a, 128b and can be inserted into the pipe members 116. The shelf or tray 134 can be suitable for storing a groom kit or other smaller items. The shelf 134 can be removably attached to the support assembly 150a.

Similar to the containment units 108a, 108b, one embodiment of the support assembly 150a has a generally triangular-shape, and can be used as a saddle rack for supporting one or more saddles. As illustrated, first and second V-shaped arm members 126a, 126b can extend from rod members 128a, 128b, to a third rod member 144, forming a generally triangular shape. The third rod member 144 can receive a bracket 132 thereon for supporting a bucket B or a plurality of buckets B, e.g., accommodating up to 18" buckets. Auxiliary rod members 174a, 174b can be provided below the V-shaped arm members 126a, 126b, to add additional support to the support assembly and provide an auxiliary rack to mount an additional tray 134 thereon.

Figure 5:
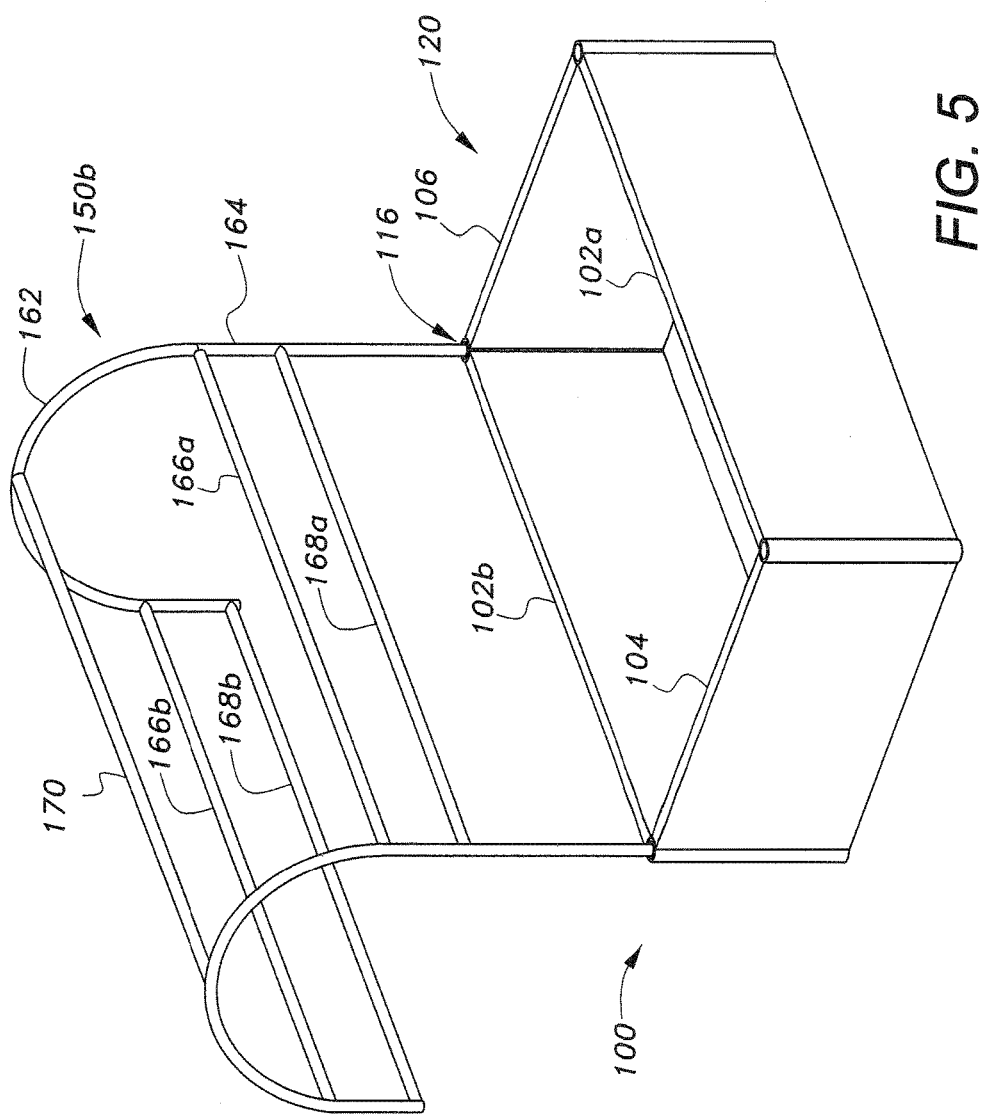
FIG. 5 is a perspective view of another embodiment of the support assembly.

Another embodiment of the support assembly 150b is illustrated in FIG. 5. The support assembly 150b is configured for removable connection to the bin 120 via connection rod members 164. Similar to the first support assembly 150a, the second support assembly 150b is configured for supporting a saddle thereon. The support assembly 150b can have a generally arcuate top portion. As illustrated, the support assembly 150b includes curved end rail members 162a, 162b provided at the end portion of the support assembly 150b. A third rod member 170 extends along the apex of the support assembly 150b.

Rail members 166a, 166b extend between the curved end rail members 162a, 162b providing a support structure suitable for mounting the tray 134a, 134b thereto. Similar to the top rail member of the support assembly 150a, the rail member 170 extends between the front end portion and back end portion of the support assembly 150b, capable of receiving a bracket member 132 thereon for supporting the bucket B. Dual rail members 168a, 168b are provided below the first arm members 166a, 166b adding additional support to the support assembly 150b and providing an auxiliary rack to mount additional trays 134 thereon.

It is to be understood that the present invention is not limited to the embodiments described above, but encompasses any and all embodiments within the scope of the following claims.

I claim:

1. A multi-functional wagon, comprising:
   a bin including a front end wall, a back end wall and opposing side walls extending between the front end wall and back end wall;
   a plurality of pipe members, at least one pipe member at each corner of the bin, each pipe member including an opening extending therethrough,
   a support assembly including a plurality of horizontal rail members and a pair of vertical connection rods depending from at least one of the horizontal rail members, the connection rods being removably inserted in a corresponding first pair of the pipe members;
   at least one containment unit having a hollow interior and having connecting extensions depending therefrom, the connecting extensions being removably inserted in a corresponding second pair of the pipe members; and
   a first handle assembly at the front of the bin and a second handle assembly at the back of the bin;
   wherein the front end wall, the back end wall, and the opposing side walls are selectively net members.

2. The multi-functional wagon according to claim 1, further comprising at least one support tray extending between and connected to the horizontal rail members.

3. The multi-functional wagon according to claim 1, wherein the support assembly has a generally arcuate top portion.

4. The multi-functional wagon according to claim 1, wherein the support assembly has a V-shaped top portion.

5. The multi-functional wagon according to claim 1, further comprising an upright net along an interior of the bin.

6. The multi-functional wagon according to claim 1, further comprising a plurality of wheels extending from the bin.

7. A multi-functional wagon, comprising:
   a bin including a front end wall, a back end wall and opposing side walls extending between the front end wall and back end wall;
   a plurality of pipe members, at least two pipe members at each corner of the bin, each pipe member including an opening extending there through;
   containment units having hollow interiors and having connecting extensions depending therefrom, the connecting extensions being removably inserted in two of the pipe members; and
   a support assembly including a plurality of horizontal rail members and a pair of vertical connection rods depending from at least one of the horizontal rail members, the connection rods being removably inserted in another two of the pipe members; and
   a first handle assembly at the front of the bin and a second handle assembly at the back of the bin.

8. The multi-functional wagon according to claim 7, further comprising at least one support tray extending between and connected to the horizontal rail members.

\* \* \* \* \*